US 6,715,885 B2

(12) United States Patent
Hirose et al.

(10) Patent No.: US 6,715,885 B2
(45) Date of Patent: Apr. 6, 2004

(54) DISPLAY DEVICE WITH SCREEN HAVING CURVED SURFACE (75) Inventors: Satoru Hirose, Kanagawa-ken (JP); Hiroshi Watanabe, Kanagawa-ken (JP); Masao Sakata, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/963,565

(22) Filed: Sep. 27, 2001

(65) Prior Publication Data
US 2002/0039229 A1 Apr. 4, 2002

(30) Foreign Application Priority Data
Sep. 29, 2000 (JP) ................ P2000-301154

(51) Int. Cl.$^7$ .................. G03B 21/14; G03B 21/00; G02F 1/1335; G09G 5/00
(52) U.S. Cl. ............... 353/69; 353/7; 353/13; 353/31; 349/11; 349/15; 345/7; 345/8; 345/9
(58) Field of Search .............. 353/7, 8, 10, 12, 353/13, 14, 69, 70; 345/7, 8, 9; 349/15

(56) References Cited

U.S. PATENT DOCUMENTS

| 5,479,224 | A | * | 12/1995 | Yasugaki et al. | ........ | 353/101 |
| 5,864,431 | A | | 1/1999 | Bordovsky | ........ | 359/630 |
| 5,871,266 | A | * | 2/1999 | Negishi et al. | ........ | 353/98 |
| 5,889,625 | A | | 3/1999 | Chen et al. | ........ | 359/637 |
| 6,304,386 | B1 | * | 10/2001 | Potin | ........ | 359/630 |
| 6,402,321 | B1 | * | 6/2002 | Harter, Jr. et al. | ........ | 353/14 |
| 6,416,181 | B1 | * | 7/2002 | Kessler et al. | ........ | 353/7 |
| 6,443,573 | B2 | * | 9/2002 | Aoki | ........ | 353/13 |
| 2002/0084950 | A1 | * | 7/2002 | Aoki et al. | ........ | 345/7 |

FOREIGN PATENT DOCUMENTS

JP        6-262964        9/1994        ........ B06K/35/00

* cited by examiner

Primary Examiner—Russell Adams
Assistant Examiner—Melissa J Koval
(74) Attorney, Agent, or Firm—McDermott, Will & Emery (57) ABSTRACT Light from a light source 23 is processed on the image display element 30 by an image signal outputted from an image control section 19 to be projected on the screen of a predetermined curved surface shape. When the light from the light source is processed by the image signal, the image control section 19 processes an aberration shape of a projected image so as to coincide with the shape of a projection curved surface of the screen. Thus, a desired image can be clearly projected on the screen having the curved surface shape.

7 Claims, 8 Drawing Sheets

| DISPLAY POSITION | INFORMATION CATEGORY | EXAMPLE |
|---|---|---|
| A | INFORMATION NECESSARY FOR DRIVING, UNNECESSARY TO PERSON IN PASSENGER SEAT | SPEED OF VEHICLE, IMAGE OF AUXILIARY CAMERA AND THE LIKE |
| B | INFORMATION UNNECESSARY FOR DRIVING | TELEVISION, INTERNET, VARIOUS DETAIL INFORMATION AND THE LIKE |
| C | INFORMATION USEFUL TO BOTH DRIVER AND PERSON IN PASSENGER SEAT | NAVIGATION AND THE LIKE |

FIG.9

FIG.10

DISPLAY DEVICE WITH SCREEN HAVING CURVED SURFACE

BACKGROUND OF THE INVENTION

1. Field of the Invention

The present invention relates to a display device for displaying various information such as character information, an image and a picture.

2. Description of the Related Art

Conventionally, a device disclosed in Japanese Patent Laid-Open No.6(1994)-262964 has been known as a display device for a vehicle use. The conventional display device is directed to display an image with an appearance of stereoscopy, and a screen on which display information is projected from a projector is designed to have a spherical surface, an elliptic curved surface or a concave curved surface.

SUMMARY OF THE INVENTION

However, in the case of a conventional display device, the projector emits only a projection light to be projected on a plane screen. If a distance between the projector and the screen is made to be shorter to reduce an arrangement space, the point of convergence does not coincide with a projection surface due to the curved surface of the projection surface of the screen. Thus, a projected image on the screen becomes out of focus at some portion of the screen, and a clear image cannot be displayed.

The image may be corrected by using an optical system to solve this problem. However, in such a case, a problem occurs that a necessary lens cannot be arranged because the space between the projector and the screen is too narrow. Even if it is possible, the cost of the device increases because the lens is required.

The object of the present invention is to provide a display device that projects display information from a plane element on a screen having a curved surface, in which every portion of a projected image does not be out of focus, a clear image can be projected without performing aberration correction by a complex optical system, and reduction of the size and the cost of the device can be achieved.

The display device of the present invention comprises: a light source; an image generator for outputting an image signal of an image to be displayed; and an image projector for processing light from the light source by use of the image signal outputted from the image generator and for projecting an image on the screen of a predetermined curved surface, and the image projector allows an aberration shape of an optical system on a projected image to be substantially coincide with the shape of a projection surface of the screen.

In the display device of the present invention, the light from the light source is processed by the image signal outputted from the image generator, and the image is projected on the screen of the predetermined curved surface. When the light from the light source is processed by use of the image signal, the aberration shape of the optical system on the projected image is processed so as to coincide with the shape of the projection surface of the screen. Accordingly, a desired image can be sharply projected on the screen of the curved surface. Therefore, according to the invention of claim 1, the image can be sharply projected on the screen having a complex curved surface, Moreover, the display device of a small size and a low cost can be provided without arranging a lens group for correcting the aberration of the optical system in the narrow space between the light source and the screen.

DETAILED DESCRIPTION OF THE PREFERRED EMBODIMENT

Figure 1:
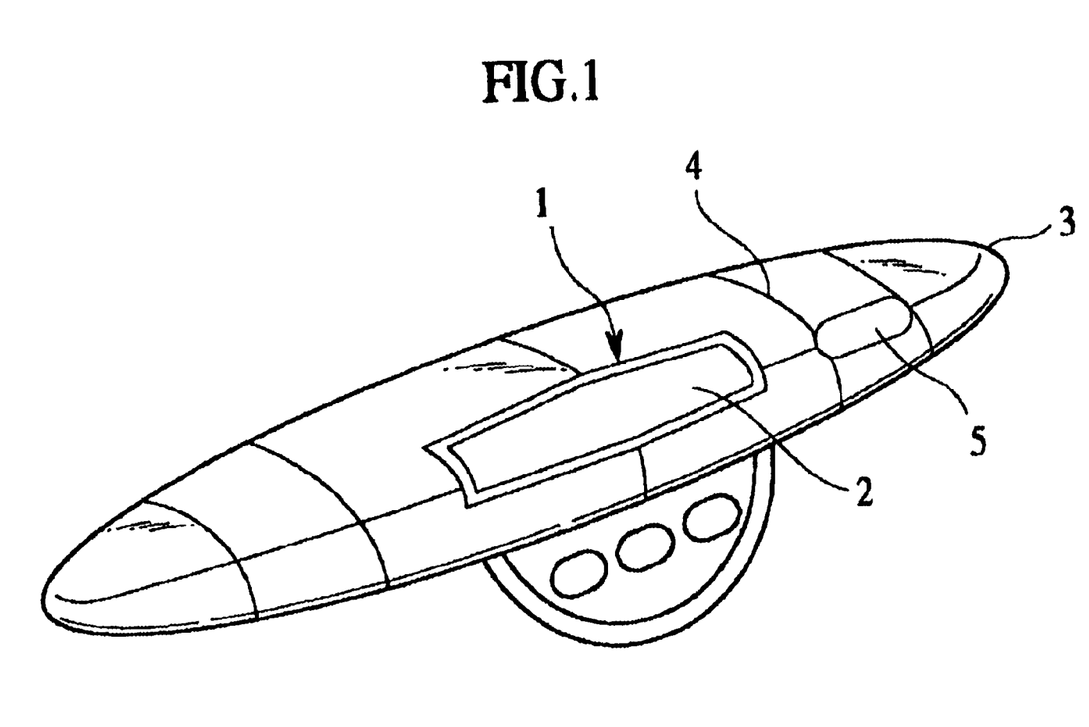
FIG. 1 is a perspective view showing a state where a display device of a first embodiment according to the present invention is installed in an instrument panel.

In the following, embodiments of the present invention will be described in detail with reference to the drawings. Description will be made for a first embodiment of the present invention based on FIG. 1 to FIG. 3. As shown in FIG. 1, a screen 2 of a display device 1 in the first embodiment is built in an instrument panel 3 that looks like a rugby ball, and a surface of the screen 2 has an outer shape continuous with other peripheral members 4 and a meter portion 5 in design. The continuity of the surface shape is evaluated quantitatively and objectively when the amount of difference between an expression representing a three dimensional surface (for example, a hyperbolic paraboloid: $x^2/a^2 - y^2/b^2 = cz$, c 0) and an actual shape is used as an evaluation function. In some cases, the shape of the screen 2 may be protruded only at the surface thereof or may be designed in a concave surface aiming at a design with an impact. However, such shapes take the continuity and harmony of the design into consideration.

Figure 2:
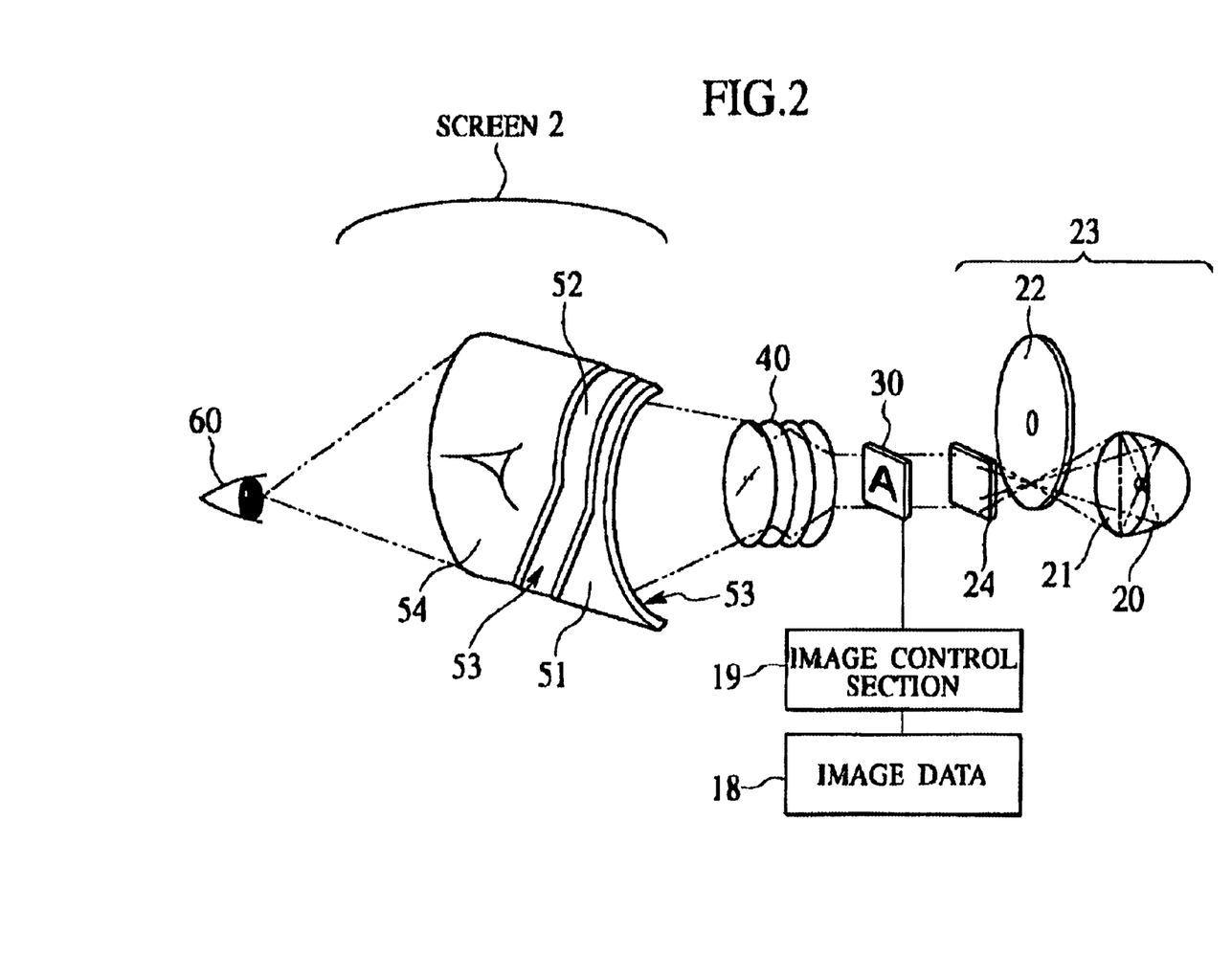
FIG. 2 is a block diagram showing a constitution of an optical system of the first embodiment.
Figure 3:
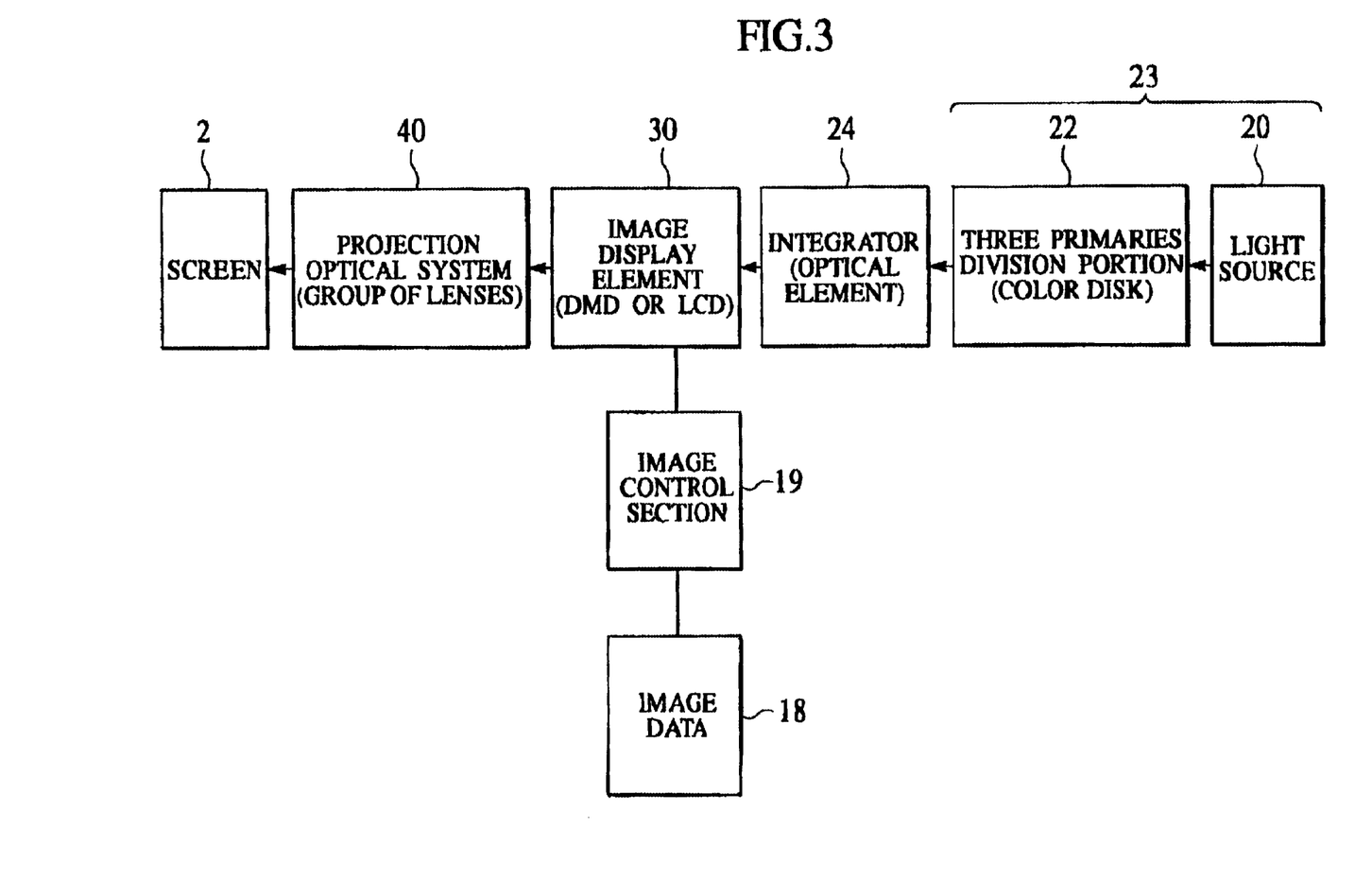
FIG. 3 is a block diagram showing a function constitution of the first embodiment.
Figure 4:
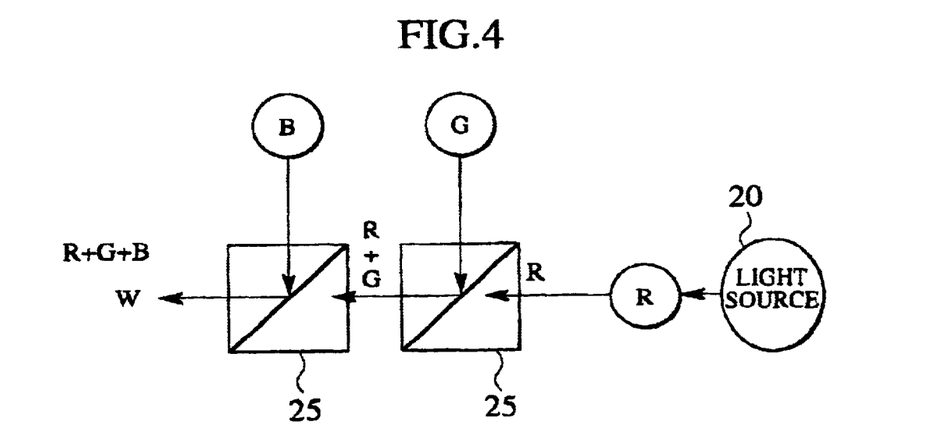
FIG. 4 is a block diagram showing another constitution of three primaries dividing section of the first embodiment.
Figure 5:
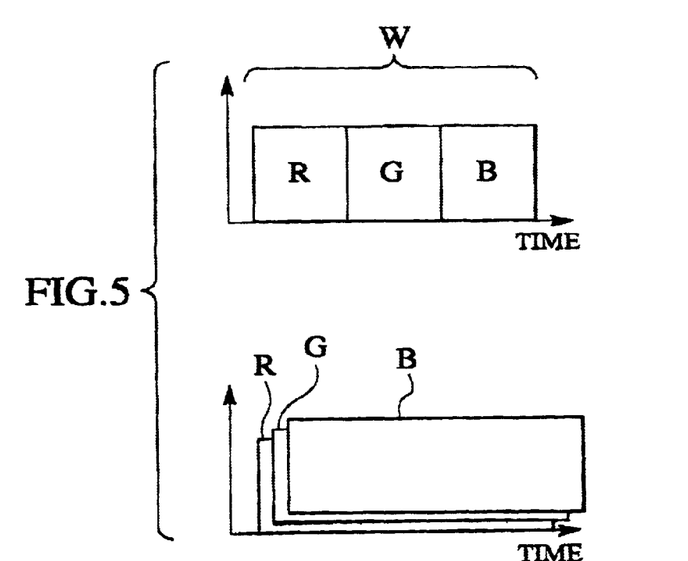
FIG. 5 is a block diagram showing still another constitution of three primaries dividing section of the first embodiment.

FIG. 2 and FIG. 3 show a constitution of an optical system of the display device of the first embodiment. A light source 20 is a discharge lamp, a halogen lamp or the like, Light from the light source 20 is converged by a reflection mirror 21 of a paraboloid or elliptic curved surface. A color disk 22 as a three primaries division portion is arranged in the vicinity of a focal point. The color disk 22 consists of color filters of the three primaries of RGB, spins at a high-speed to obtain the three primaries from the light coming from the light source 20 in a time-division manner, and a color display is provided by mixture of the obtained primaries. As the color display method, a time-division synthesis method or a field sequential method can be adopted. For example, as a method of deriving a colored light from the light source 20 to an image display element 30 (described later), as shown in FIG. 4, the light from the light source 20 is made to go through the filters (optical element 25) of R, G and B independently, and the lights went through the filters are synthesized on a time basis. Thus, light having a desired color is created. Alternatively, as shown in FIG. 5, lights from emission light sources of R, G and B are emitted from an LED, a neon tube or the like, and controlled on a time basis. Thus, light having a desired color is created. Note that the light source 20, the reflection mirror 21 and the color disk (the three primaries division portion) 22 constitute a three-color emission light source 23.

An integrator 24 is an optical element that manipulates the light coming out of the color disk 22 so as to make the light uniform in brightness and substantially parallel. The integrator 24 consists of a flat panel where micro lenses are arranged in an array. The light from the integrator 24 forms the real image of the light source on the surface of the image display element 30.

The image display element 30 is composed of a reflective DMD (Digital Micromirror Device) or a transmission LCD such as a TFT liquid crystal and a ferroelectric liquid crystal. The image display element 30 generates a display image by turning a micro mirror or a liquid crystal cell corresponding to each pixel of the image on/off by an image control section 19 depending on image data 18. The length of "on" time of the micro mirror or the liquid crystal cell of each color of RGB is adjusted to control the brightness and the color.

The image data 18 is previously distorted according to the curved surface shape of the projection surface of the screen 2. For example, when the image data 18 is distorted in an inverse transformation of the shape of the projection surface of the screen 2, a straight line can be displayed as a straight line on the curved surface of the screen 2.

An image light from the image display element 30 is made to go through a group of projection lenses constituting a projection optical system 40, and projected on the projection surface of the screen 2. Herein, the distance between the group of projection lenses 40 and the screen 2 must be made smaller in order to make the entire device smaller. On the contrary, an angle of view becomes large because a display size needs to be large. Accordingly, an aberration of the projected image (a phenomenon that the position of an image forming point, which is the real image, separates from an ideal point as the distance from an optical axis becomes larger.) becomes larger. For example, a curvature of field is calculated in: Petzval surface $z = D \times R \times y^2$ (an approximate rotation paraboloid), where z denotes the amount of displacement in an optical axis direction, D denotes a coefficient determined by an optical characteristic such as a refraction index and a focal length of the lenses, R denotes a distance from an exit pupil of the projection optical system to the projection surface, and y denotes a coordinate in the perpendicular direction to the optical axis.

Generally, in the projector, various kinds of optical lenses are combined to minimize the aberration. However, the aberration contrarily works conveniently for the curved surface screen. Particularly, in the curved surface screen in accordance with the curvature of field, a clear image can be projected and the optical system for correcting aberration can be omitted. The aberration correction is performed by a combination of convex and concave lenses, adjustment of the focal length of lens, changing of lens material (refraction index and Abbe constant), adjustment of an aperture diameter of the projection optical system and the like. Such an optical system can be omitted. Accordingly, a low cost, a light weight and a space saving of the device can be realized. Note that a group of mirrors having the same operation may be adopted to the projection optical system 40, instead of the group of lenses.

The screen 2 consists of a light deflection member 51, a filter 52, an optical film 53 and a transparent thin film 54. The light deflection member 51 of the screen 2 is the one that deflects (diffuses) the light from the group of lenses 40 of the projection optical system in a limited range. A transparent plastic plate, a plastic plate of ivory yellow color, the surface of which is subjected To a blasting treatment for diffusing the light, a diffusion type liquid crystal or the like is used. Alternatively, the light deflection member 51 may be a screen where a diffusion layer made of paper or the like is sandwiched by two pieces of transparent glasses or plastic plates. The filter 52 of the screen 2 is the one for reducing reflection of external light between the light deflection member 51 and a viewer 60. The optical film 53 having an optical low reflection characteristic is provided on the surface of the light deflection member 51 that faces the group of lenses 40. The optical film 53 is the one for preventing the light from the group of lenses 40 of the projection optical system from becoming stray light in the device and for reducing a double reflection image of the light on the light deflection member 51. The optical film 53 of the low reflection characteristic is also provided on the surface of the filter that faces the viewer.

The transparent thin film 54 of the screen 2 is for preventing a scratch and a blemish on the surface, which consists of a hard coat or a water repellency coating film. A transparent thin film having electrical conductivity such as ITO film (yttrium oxide film) for reducing electromagnetic noise may be provided in a multicoated state on the transparent thin film 54.

Figure 6:
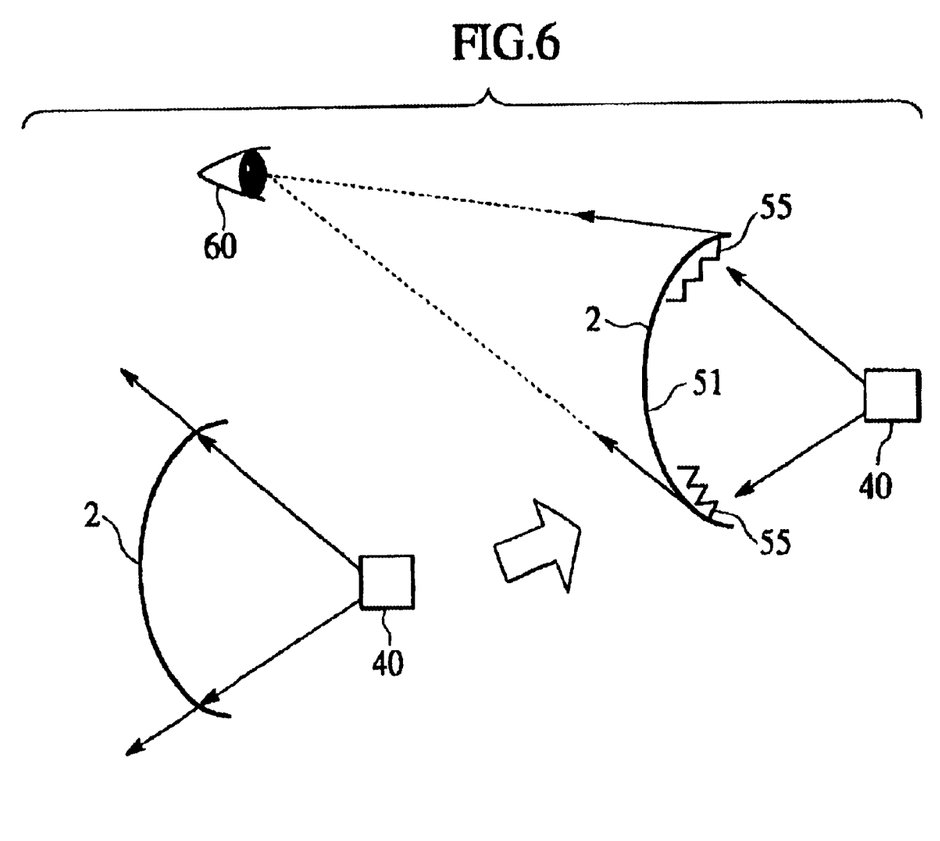
FIG. 6 is a sectional view showing another example of a constitution of a screen of the first embodiment.

Note that, as to the screen 2, the direction of a louver (not shown) attached outside the screen 2 may be changed in accordance with the curvature and the attached position of the screen 2 such that the transmittance is maximum in the direction of the viewer 60. Alternatively, as shown in FIG. 6, optical elements 55 such as a group of micro prisms for directivity conversion and a hologram for deflecting light by utilizing a diffraction phenomenon may be inserted between the group of lenses 40 of the projection optical system and the light deflection member 51.

The curved surface shape of the screen 2 may be substantially a Petzval surface, or may be a shape between the Petzval surface and a tangential image surface of astigmatism and a spherical image surface.

In the above-described embodiment, the curved surface shape of the projection surface of the screen 2 is a convex surface (seen from the viewer 60). However, the curved surface can be made in a shape that fits the surface shape and the curvature of the instrument panel 3 in accordance with the shape thereof, such as a concave surface and a combined curved surface of a plane and a concave or convex surface. No limitation is given to the surface shape of the screen 2. The projection surface of the screen 2 may be convex relative to the projection optical system in the case where the distortion of the projection optical system is a pin-cushion type, and may be concave relative to the projection optical system in the case where the distortion of the projection optical system is a barrel type.

Next, an operation of the display device of the above-described first embodiment will be described. As shown in FIG. 1, the display device 1 of this embodiment is built in the instrument panel 3 of the vehicle, and projectively displays an image on the screen 2 in which continuity in design with the surface of the instrument panel 3 is considered. In this case, as described in the conventional art, the previously distorted image is generated in accordance with the curved surface shape of the projection surface of the screen 2, instead of generating the plane image from the image data 18 by the image control section 19. Therefore, the image actually projected on the screen 2 from the image display element 30 through the group of lenses 40 becomes the plane image substantially without distortion. In other words, the image without distortion can be displayed for the viewer such that a straight line can be seen as a straight line, a square can be seen as a square and a circle can be seen as a circle.

Figure 7A:
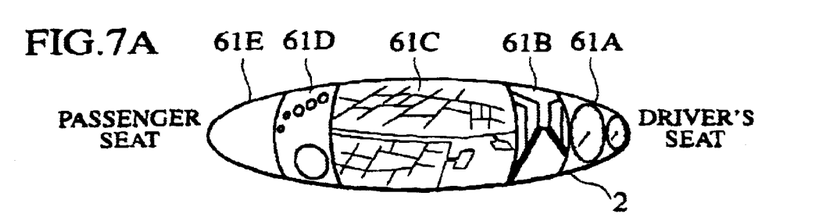
FIG. 7A and FIG. 7B are a front view and a plan view of a screen of a second embodiment according to the present invention, respectively.

Next, a second embodiment of the present invention will be described based on FIG. 7A, FIG. 7B and FIG. 8. A characteristic of the second embodiment resides in the curved surface shape of the screen 2.

Figure 7B:
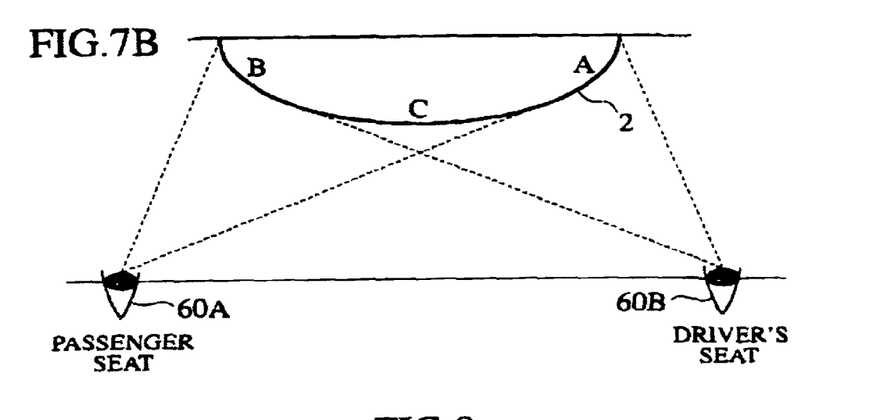
Figure 8:
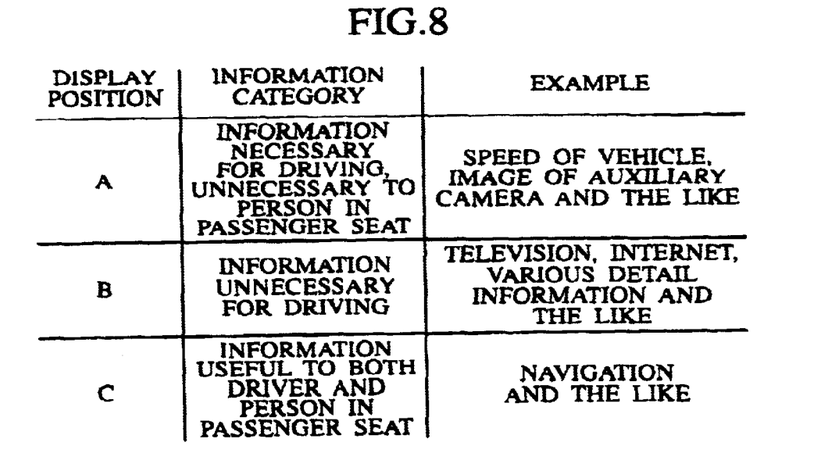
FIG. 8 is an example of a table showing display contents of every display position of the screen of the second embodiment.

Specifically, the screen 2 is made to have the elliptic curved surface or a similar curved surface shape as shown in FIG. 7B. Accordingly, in the case where this screen is installed at the center of the instrument panel in the horizontal direction, the range severally seen from a passenger seat and a driver's seat is naturally limited. In other words, a viewer 60A in the passenger seat cannot see a portion A of the screen 2, and on the contrary, a viewer 60B in the driver's seat cannot see a portion B of the screen 2. The both viewers 60A and 60B can see a portion C at the center of the screen 2 in the horizontal direction. Then, as shown in FIG. 7A, the projection surface of the screen 2 is divided into a plurality of sections in the horizontal direction, that is, five sections 61A to 61E. Thus, information as shown in FIG. 8 is displayed on each section.

For example, on the section which can be seen by only the viewer 60B in the driver's seat, that is, on the section in the portion A of the screen 2, the information necessary to the driver but not so necessary to a person in the passenger seat is displayed, for example, speed of a vehicle 61A and an image of an auxiliary camera 61B. On the section which can be seen from both of the driver's seat and the passenger sear, such as the section in the portion C of the screen 2, the information necessary to both the driver and the person in the passenger seat is displayed, for example, navigation information 61C. And then, on the section in the portion B of the screen 2, which can be seen by only the viewer 60A in the passenger seat, the information unnecessary to the driver during driving is displayed, for example, the Internet information 61D and a television image 61E.

Thus, the information necessary to each viewer can be displayed on the position easily seen by the viewer in accordance with a viewpoint thereof.

Next, a third embodiment of the present invention will be described based on FIG. 9. The display device of this embodiment is the one in which a stereoscopic display is enabled by a parallax of the right and left eyes by using two pieces of lenticular lenses 56 in the screen 2, even if a pair of spectacles such as liquid crystal shutter spectacles is not used.

Figure 9:
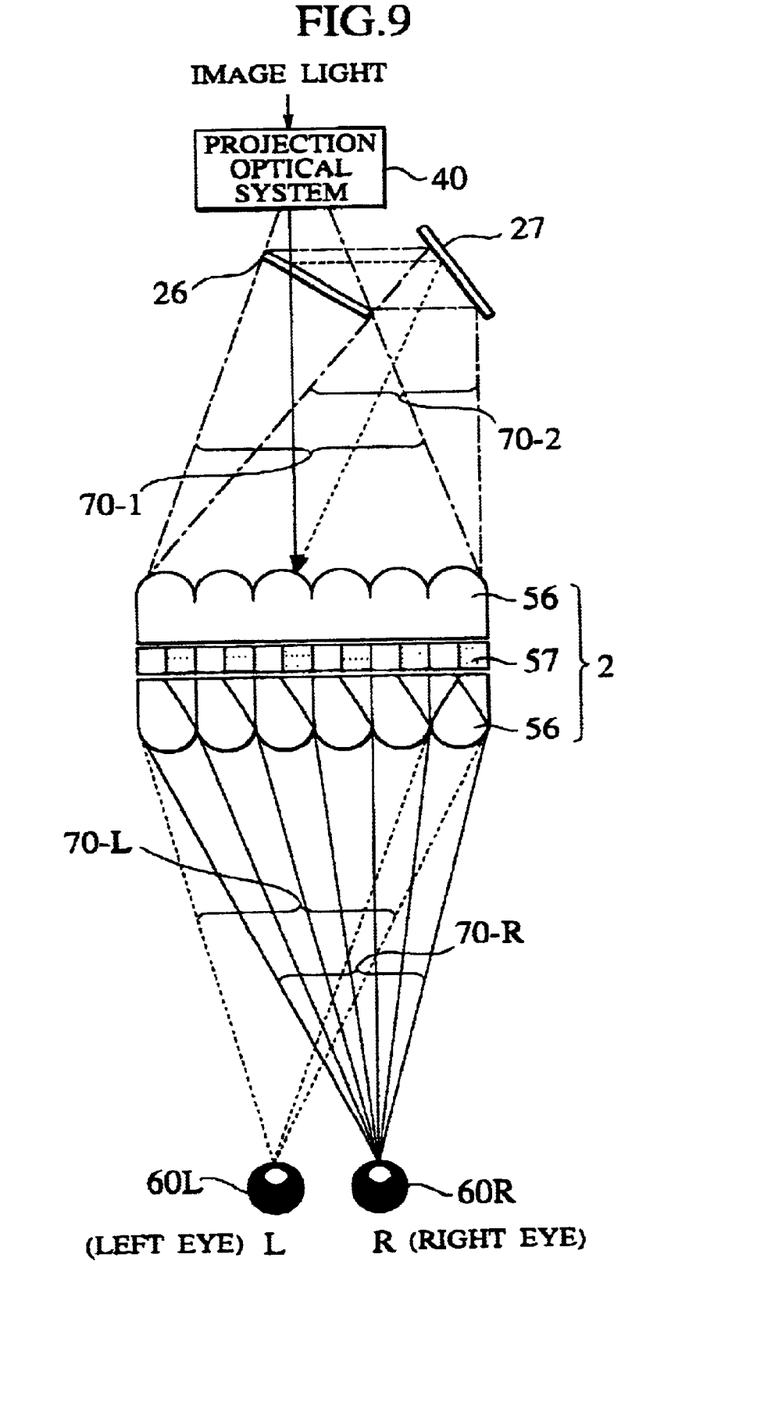
FIG. 9 is a block diagram showing a constitution of a screen portion of a third embodiment according to the present invention.

In FIG. 9, the image light input to the projection optical system 40 is outputted to a beam splitter 26, and the image light is divided into two pictures by turning the beam splitter 26 on/off. Specifically, the image light in the case of the "on" timing goes through the beam splitter 26 and is directly incident on the screen 2 as the image light of one picture 70-1. On the other hand, the image light in the case of "off" timing is reflected by the beam splitter 26 to be incident on a total reflection mirror 27. The image light is reflected by the total reflection mirror again to be incident on the screen 2 as the image light of another picture 70-2.

The screen 2 is constituted of the lenticular lenses 56 on the front and back thereof and a light diffusion layer 57 arranged between the lenticular lenses. Accordingly, the picture of the image light that directly comes from the beam splitter 26 and the picture of the image light that comes from the total reflection mirror 27 in a reflected manner are incident to the screen 2 alternatively. The right and left eyes 60R and 60L respectively see the two pictures 70-R and 70-L having the parallax of the right and left eyes, and thus the stereoscopic image can be seen. For displaying the stereoscopic image, the information exclusive for each of the right and left pictures may be projected from different positions to the screen 2.

Accordingly, the information can be stereoscopically displayed in the display device of this embodiment.

Figure 10:
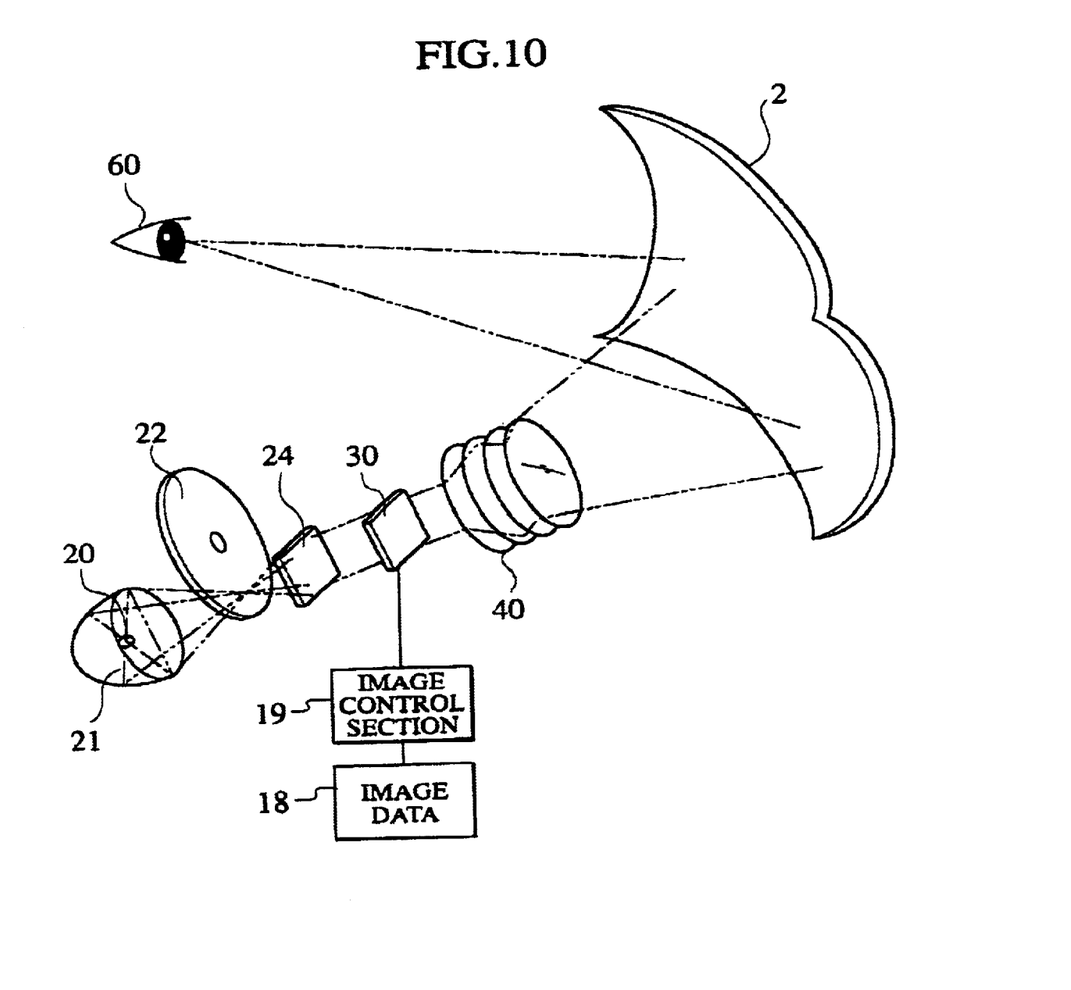
FIG. 10 is a block diagram showing a constitution of an optical system of a fourth embodiment according to the present invention.

Next, a fourth embodiment will be described based on FIG. 10. The fourth embodiment is characterized in that it adopts a front projection method with the screen 2 of the concave shape. Specifically, the embodiment is different from the display device of the first embodiment shown in FIG. 2 and FIG. 3 in the point that the image is projected from a position in the front surface side of the concave curved screen 2, which is the same side as the viewer 60. Since other constituent elements are the same as those of the first embodiment, reference numerals common to the first embodiment are given to the elements.

Even in this embodiment, a processing is performed to distort the image data 18 previously by the image control section 19 in accordance with the shape of the concave curved surface of the screen 2, an image based on the distorted data is generated by the image display element 30, and the image is projected on the screen 2 through the projection optical system 40.

Accordingly, the entire image of the screen, which is relatively large as the display device of the front projection method, can be displayed substantially without distortion and defocus.

Japanese Patent Application No. 2000-301154 with filing date of Sep. 29, 2000 is expressly incorporated herein by reference in its entirety.

What is claimed is:

1. A display device to be installed in an instrument panel of a vehicle, comprising:

a three-color emission light source;

a screen having a predetermined curved surface;

an image generator for outputting an image signal of an image to be displayed, said image generator including image data previously distorted according to the predetermined curved surface of said screen and an image control section outputting an image signal depending on said image data;

an image projector for processing light from said three color emission light source by use of the image signal outputted from said image generator and for projecting an image on said screen of the predetermined curved surface, and a projection optical system through which the image is projected to said screen, wherein said image projector allows an aberration shape of an optical system on a projected image to substantially coincide with the shape of the predetermined curved surface of said screen.

2. The display device according to claim 1,
wherein the shape of the projection curved surface of said screen is a curved surface shape between Petzval surface by a curvature of field of a projection optical system and a tangential image surface of astigmatism and a spherical image surface.

3. The display device according to claim 1,
wherein said screen is made to have a projection surface of a convex surface relative to said projection optical system in the case where a distortion of said projection optical system is pin-cushion type, and made to have a projection surface of a concave surface relative to the projection optical system in the case where the distortion of said projection optical system is a barrel type.

4. The display device according to claim 1,
wherein said image projector performs a processing to distort an image signal in advance, which is outputted from said image generator, and makes an aberration shape of said projection optical system substantially coincide with the shape of the projection curved surface of said screen.

5. The display device according to claim 1,
wherein the surface shape of said screen is continuous with peripheral members including a support member in the vehicle, in which the display device is built in, in design.

6. The display device according to claim 1,
wherein said screen is divided into a plurality of projection sections,
each projection section is arranged so as to be directed to a driver and/or passengers in the vehicle,
said image projector projects different display information to each of the projection sections, and
said projection sections includes a first projection section to be displayed with the information necessary to the driver, a second projection section to be displayed with the information necessary to both the driver and the passengers, and a third projection section to be displayed with the information unnecessary to the driver for the driver.

7. A display device to be installed in an instrument panel of a vehicle, comprising:
a light source;
a color separation device for separating light from said light source into three primary colors of RGB;
an integrator for controlling the light from said color separation device so as to make the light uniform in brightness and substantially parallel;
a screen having a predetermined curved surface;
image generating means for outputting an image signal of an image to be displayed, said image generating means including an image data previously distorted according to the predetermined curved surface of said screen and an image control section outputting an image signal depending on said image data;
image projecting means for processing light from said integrator by use of the image signal outputted from said image generating means and for projecting an image on said screen of the predetermined curved surface, and
a projection optical system through which the image is projected to said screen,
wherein said image projecting means allows an aberration shape of an optical system on a projected image to substantially coincide with the shape of the predetermined curved surface of said screen.

* * * * *